US008675647B1

(12) United States Patent
Luciani

(10) Patent No.: US 8,675,647 B1
(45) Date of Patent: Mar. 18, 2014

(54) NON-BROADCAST MULTIPLE ACCESS INVERSE NEXT HOP RESOLUTION PROTOCOL (INNHRP)

(75) Inventor: James V. Luciani, Acton, MA (US)

(73) Assignee: Rockstar Consortium US LP, Plano, TX (US)

( * ) Notice: Subject to any disclaimer, the term of this patent is extended or adjusted under 35 U.S.C. 154(b) by 0 days.

(21) Appl. No.: 09/786,529

(22) PCT Filed: Aug. 26, 1999

(86) PCT No.: PCT/US99/19490
§ 371 (c)(1),
(2), (4) Date: Oct. 8, 2010

(87) PCT Pub. No.: WO00/13391
PCT Pub. Date: Mar. 9, 2000

Related U.S. Application Data

(60) Provisional application No. 60/098,019, filed on Aug. 26, 1998.

(51) Int. Cl.
H04L 12/28 (2006.01)
(52) U.S. Cl.
USPC ............... 370/389; 370/395.52; 370/395.53; 370/395.54
(58) Field of Classification Search
USPC ............................................. 370/352, 389
See application file for complete search history.

(56) References Cited

U.S. PATENT DOCUMENTS

| 5,412,654 | A | * | 5/1995 | Perkins | 370/312 |
| 5,633,869 | A | * | 5/1997 | Burnett et al. | 370/396 |
| 5,684,800 | A | * | 11/1997 | Dobbins et al. | 370/401 |
| 5,889,777 | A | * | 3/1999 | Miyao et al. | 370/395.52 |
| 6,009,102 | A | * | 12/1999 | Horikawa et al. | 370/401 |
| 6,047,329 | A | * | 4/2000 | Horikawa et al. | 709/238 |
| 6,052,683 | A | * | 4/2000 | Irwin | 707/758 |
| 6,172,981 | B1 | * | 1/2001 | Cox et al. | 370/401 |
| 6,178,171 | B1 | * | 1/2001 | Alexander et al. | 370/395.54 |
| 6,188,689 | B1 | * | 2/2001 | Katsube et al. | 370/389 |
| 6,205,148 | B1 | * | 3/2001 | Takahashi et al. | 370/401 |
| 6,208,649 | B1 | * | 3/2001 | Kloth | 370/392 |
| 6,269,099 | B1 | * | 7/2001 | Borella et al. | 370/389 |
| 6,304,546 | B1 | * | 10/2001 | Natarajan et al. | 370/216 |
| 6,421,321 | B1 | * | 7/2002 | Sakagawa et al. | 370/238.1 |
| 6,442,158 | B1 | * | 8/2002 | Beser | 370/352 |
| 6,452,921 | B1 | * | 9/2002 | Alexander et al. | 370/351 |
| 6,614,791 | B1 | * | 9/2003 | Luciani et al. | 370/395.53 |
| 6,625,156 | B2 | * | 9/2003 | Shaio et al. | 370/395.21 |
| 6,650,631 | B1 | * | 11/2003 | Benash et al. | 370/352 |
| 6,667,957 | B1 | * | 12/2003 | Corson et al. | 370/238 |
| 6,711,152 | B1 | * | 3/2004 | Kalmanek et al. | 370/351 |
| 6,898,200 | B1 | * | 5/2005 | Luciani | 370/352 |
| 6,947,423 | B2 | * | 9/2005 | Horikawa | 370/392 |

* cited by examiner

Primary Examiner — Brian O'Connor
(74) Attorney, Agent, or Firm — Christopher & Weisberg, P.A.

(57) ABSTRACT

The present invention is a method and apparatus for obtaining information transmitted between a source station and a destination station in a non broadcast multiple access network. A connection between the source station and a server for the destination station is established. The server has a cache containing the information. The source station transmits a request packet having parameters relating to the information to the server. The source station receives a reply packet containing the information from the server. The reply packet matches the parameters of the request packet.

52 Claims, 7 Drawing Sheets

NON-BROADCAST MULTIPLE ACCESS INVERSE NEXT HOP RESOLUTION PROTOCOL (INNHRP)

CROSS REFERENCE TO RELATED APPLICATION

This Application claims the benefit and priority of the filing date of International Application Serial No. US99/19490, filed on Aug. 26, 1999, which, in turn, claims the benefit of the filing of Provisional Application 60/098,019, filed on Aug. 26, 1998.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention is related to data communications. In particular, the present invention is related to a Non-Broadcast Multiple Access (NBMA), Inverse Next Hop Resolution Protocol (InNHRP) for identifying an internetwork address or for resolution of subnetwork resources.

2. Description of Related Art

The Inverse Address Resolution Protocol (InARP), as set forth in Bradley, T., Brown, C., and Malis, A., "Inverse Resolution Protocol", Work In Progress (intended to replace RFC 1293), allows a station, i.e., a node, in a subnetwork to request an upper layer protocol address corresponding to a particular hardware address. InARP is specifically designed, for example, to provide a station in a Frame Relay network the ability to determine the protocol address of a station on the other side of a Permanent Virtual Circuit (PVC) connection, given the Data Link Connection Identifier (DLCI—the Frame Relay hardware address) associated with the PVC. InARP is limited, however, in that it only provides for protocol address resolution, and only within a single subnetwork. Furthermore, InARP and the like have no provision for dealing with NBMA link layer technologies such as anycast addresses, which may require a query to traverse multiple LIS subnets.

Accordingly, there is a need in the technology for a method and apparatus for overcoming the above-identified problems. There is a particular need for a method and apparatus to provide for the resolution of addresses and resources across subnetworks.

BRIEF SUMMARY OF THE INVENTION

The present invention is a method and apparatus for obtaining information transmitted between a source station and a destination station in a non broadcast multiple access network. A connection between the source station and a server for the destination station is established. The server has a cache containing the information. The source station transmits a request packet having parameters relating to the information to the server. The source station receives a reply packet containing the information from the server. The reply packet matches the parameters of the request packet.

According to one embodiment of the present invention, the request packet and the reply packet are instances of a protocol packet. The protocol packet has a fixed part, a mandatory part, and optionally an extensions part. The extension part provides additional resource information. The parameters of the protocol packet include at least one of the fixed part, the mandatory part, and the extensions part.

The advantages of the invention include a method to efficiently obtain the requested information in an NBMA network using a well defined protocol. The information is cached at both the server and the source station at the registration, resolution, and configuration phases.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The features and advantages of the present invention will become apparent from the following detailed description of the present invention in which.

DETAILED DESCRIPTION OF THE EMBODIMENTS

Figure 1:
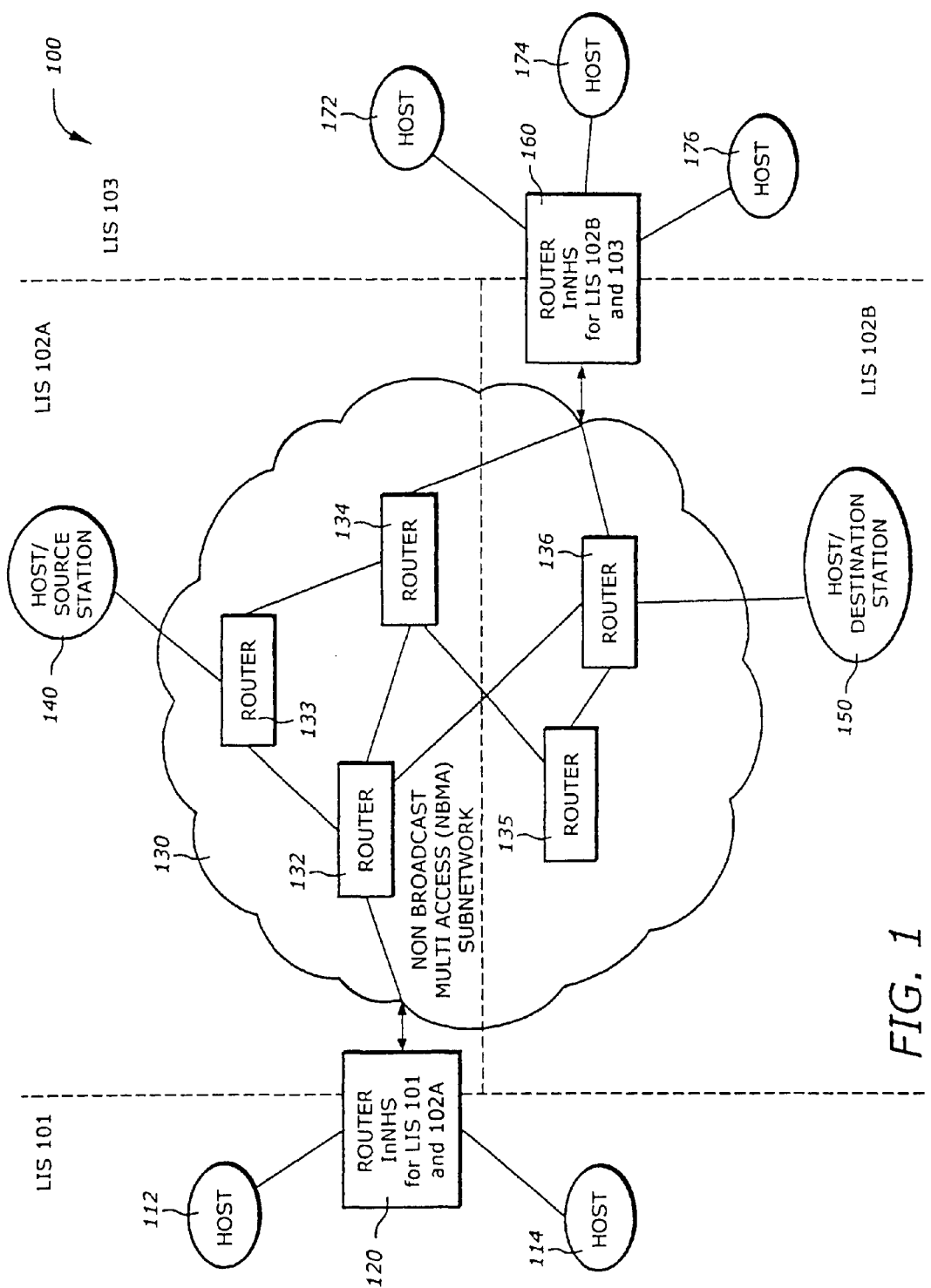
FIG. 1 is a diagram illustrating a network system in which one embodiment of the invention can be practiced.

Described is a method and apparatus for obtaining information to resolve an internetwork address, or an instance of a higher layer protocol or resource in a non-broadcast, multiple access (NBMA) network, given an ISO OSI layer 2 (i.e., network dependent layer) address. The method and apparatus contemplates using an Inverse Next Hop Resolution Protocol (InNHRP) so that a source station can resolve the internetwork address of a destination station or resolve resource availability.

In the following description, numerous specific details are set forth in order to provide a thorough understanding of the present invention. It will be apparent, however, to one of ordinary skill in the art that the present invention may be practiced without these specific details. In other instances, well-known architectures, steps, and techniques have not been shown where unnecessary for an understanding of the present invention. For example, specific details are not provided as to whether the method is implemented in a station as a software routine, hardware circuit, firmware, or a combination thereof.

In alternative embodiments, the present invention may be applicable to implementations of the invention in integrated circuits or chip sets, wireless implementations, switching systems products and transmission systems products. For purposes of this application, the terms switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access multiplexors, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

Embodiments of the invention may be represented as a software product stored on a machine-readable medium (also referred to as a computer-readable medium, a processor-readable medium, or a computer usable medium having a computer readable program code embodied therein). The machine-readable medium may be any type of magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data. Those of ordinary skill in the art will appreciate that other instructions and operations necessary to implement the described invention may also be stored on the machine-readable medium.

Terms used herein are defined as follows:

Internetwork layer: the media-independent layer such as the Internet Protocol in the case of Transport Control Protocol/Internet Protocol (TCP/IP networks).

Subnetwork layer: the media-dependent layer underlying the internetwork layer, including the NBMA technology (ATM, X.25, SMDS, etc.)

Server: generally refers to an Inverse Next Hop Server (InNHS). An InNHS is an entity performing the Inverse Next Hop Resolution Protocol service within the NBMA cloud.

Client: generally refers to an Inverse Next Hop Resolution Protocol client (InNHC). An InNHC is an entity that initiates InNHRP requests of various types in order to obtain access to the InNHRP service.

Station: generally refers to a host or router that contains an InNHRP entity. The term station may describe a "user" of the InNHRP client or service functionality.

The present invention is a technique for address and resource resolutions by obtaining information transmitted between a source station and a destination station in a non broadcast multiple access (NBMA) network. A connection between the source station and a server for the destination station is established. The server has a server cache that contains the information. The source station transmits a request packet that contains parameters relating to the information to the server. The source station receives a reply packet that contains the information from the server. The reply packet matches the parameters of the request packet.

The information may be an internetwork layer address or an instance of a resource information. The resource information may include resource availability, an upper layer address information, or any other additional information. The resolution of the information is achieved by transmitting protocol packets that follow a well-defined protocol, the inverse NHRP (InNHRP). The protocol packet comprises the request packet and the reply packet.

The format of the protocol packet includes a fixed part, a mandatory part, and optionally an extensions part. The parameters to be matched for information resolution include at least one of the fixed part, the mandatory part, and the extensions part. In particular, the extensions part provides time, length, value (TLV) triplets which contain resource information or any other information.

The server cache contains mappings of the NBMA addresses and the internetwork layer addresses of the destination station as part of the stored information. Address resolution is achieved by matching the appropriate fields in the request packet with the mappings. Resource resolution is achieved by using the extensions part including the use of the TLV triplets.

The server cache updates the information during configuration, registration, and resolution. The source cache also updates the information as it propagates through the network. The cache update is based on a synchronous cache management scheme.

FIG. 1 is a diagram illustrating a network system 100 in which one embodiment of the invention can be practiced. The network system 100 comprises hosts 112, 114, 140, 150, 172, 174, and 176, and routers 120, 132, 133, 134, 135, 136, and 160.

In the exemplary network system 100, the host 140 acts as a source station and the host 150 acts as a destination station. The source station 140 and the destination station 150 are connected to a non broadcast multi-access (NBMA) subnetwork 130. The NBMA subnetwork 130 comprises the routers 132, 133, '34, 135, and 136. The NBMA subnetwork 130 may be an ATM cloud. The routers 133 and 136 are directly coupled to the source and destination stations 140 and 150, respectively.

With reference to FIG. 1, the NBMA Inverse Next Hop Resolution Protocol (InNHRP) allows the source station 140, wishing to communicate over the NBMA subnetwork 130 to determine the internetworking layer address of the destination station 150 or an instance of an internetworking or higher layer information or resource. In general, a subnetwork is non-broadcast either because it technically doesn't support broadcasting (e.g., an X.25 subnetwork) or because broadcasting is not feasible for one reason or another (e.g., an SMDS multicast group or a large Ethernet/IEEE 802.3 local area network).

The network system 100 may also be divided into logically independent Internet Protocol (IP) subnets (LISs) LIS 101, LIS 102A, LIS 102B, and LIS 103. The LISs 101, 102A, 102B, and 103 have the following properties: (1) all members of a LIS have the same IP network/subnet number and address mask, (2) all members of a LIS are directly connected to the same NBMA subnetwork, (3) all hosts and routers outside of the LIS are accessed via a router, and (4) all members of a LIS access each other directly (without routers or switches). Another way to model NBMA is by using the notion of Local Address Groups (LAGs). The essential difference between the LIS and the LAG models is that while in the LIS model the outcome of the "local/remote" forwarding decision is driven by addressing information, in the LAG model the outcome of this decision is decoupled from the addressing information. In the LAG model, the forwarding decision is coupled with the Quality of Service and/or traffic characteristics. With the LAG model, any two entities on a common NBMA network could establish direct communication with each other, irrespective of the addresses of the entities.

Support for the LAG model assumes the existence of a mechanism that allows any entity (e.g., host or router) connected to an NBMA network to resolve either an internetworking layer address to an NBMA address, or an NMBA address to an internetworking layer address, for any other entity connected to the same NBMA network. This resolution would take place regardless of the address assignments to these entities. Both NHRP and Inverse NHRP provide such a mechanism. For example, when the internetworking layer address is of type IP, once the subnetwork address and NBMA next hop has been resolved, the source may either start sending IP packets to the destination (in a connectionless NBMA subnetwork such as SMDS) or may first establish a connection to the destination with the desired bandwidth (in a connection-oriented NBMA subnetwork such as ATM).

Use of InNHRP may be sufficient for hosts performing internetworking layer address resolution when those hosts are directly connected to an NBMA subnetwork, allowing for straightforward implementations in NBMA stations.

Traditional address resolution techniques may be in use when Inverse NHRP is deployed. Similarly, other inverse address resolution techniques may be in use when Inverse NHRP (InNHRP) is deployed, as described herein. ARP or Inverse ARP (InARP) servers and services over NBMA subnetworks may be required to support hosts that are not capable of dealing with any model for communication other than the LIS model, and deployed hosts may not implement InNHRP but may continue to support InARP variants.

Below is provided a brief description of how the source station 150 uses InNHRP to determine the internetwork layer address of the destination station 160. Additionally, the source station 150 uses InNHRP to determine an instance of an internetwork layer or higher layer, e.g., transport or application layer, resource.

For administrative and policy reasons, a physical NBMA subnetwork may be partitioned into several, disjoint "Logical NBMA subnetworks". For example, physical NBMA subnetwork 130 is partitioned into LISs 102A and 102B. A Logical NBMA subnetwork is defined as a collection of hosts and routers that share unfiltered subnetwork connectivity over an NBMA subnetwork. "Unfiltered subnetwork connectivity" refers to the absence of closed user groups, address screening or similar features that prevent direct communication between stations connected to the same NBMA subnetwork. (Hereafter, unless otherwise specified, the term "NBMA subnetwork" is used to mean logical NBMA subnetwork.)

Placed within the NBMA subnetwork are one or more entities that implement the InNHRP protocol. Such stations that are capable of answering InNHRP Resolution Requests are known as "Inverse Next Hop Servers" (InNHSs). Each InNHS serves a set of hosts connected to the NBMA subnetwork. InNHSs cooperatively resolve internetwork addresses and the availability of an instance of internetwork and upper layer resources within their logical NBMA subnetwork. For example, router 120 is an InNHS for LIS 101 and LIS 102A, while router 160 is the InNHS for LIS 102B and LIS 103.

As an InNHS, router 120 provides address resolution on behalf of routers 132, 133, and 134, as well as host 140. Such an InNHS is said to be "serving" the stations. A station in a LIS that lacks InNHS functionality and is a client of the InNHRP service is known as InNHRP Client or InNHC.

An InNHS maintains a cache that contains mappings of NBMA subnetwork layer addresses to internetwork layer addresses. This cache can be constructed from information obtained from InNHRP register packets, from InNHRP resolution request/reply packets, or through other mechanisms. Examples of such mechanisms might include the InARP and pre-configured tables.

Both InNHCs and InNHSs also maintain a cache of NBMA address to resource resolution information. This cache is populated through information obtained from InNHRP resolution reply packets, from manual configuration, or through mechanisms outside the scope of the present invention.

Deployment:

Each station chooses a neighboring InNHS to which it will forward an InNHRP resolution request. The InNHRP resolution request arrives at a station that is to generate an InNHRP resolution reply. This responding station "serves" the "client" destination station. The responding station generates an InNHRP resolution reply using the source protocol address from within the InNHRP packet to determine where the InNHRP resolution reply should be sent.

An InNHC may use any applicable means (such as static configuration information) in order to determine to which neighboring InNHS to forward the InNHRP resolution request packet. The use of static configuration information for this purpose is beyond the scope of this invention.

The InNHS serving a particular destination station is in the same LIS as the destination station. If multiple, redundant InNHSs exist in a LIS, it is important that all InNHSs have at least some portion of their resolution databases synchronized so that a packet arriving at one router/InNHS in the LIS/LAG is treated in the same fashion as a packet arriving at a different router/InNHS for the given LIS/LAG. One method, among others, is to use the Server Cache Synchronization Protocol (SCSP). It is recommended that SCSP be the method used when a LIS/LAG contains two or more router/InNHSs.

If an NBMA network offers a group, anycast, or multicast addressing feature, then the InNHC may be configured with, i.e., to recognize, such an address (appropriate to the routing domain in which it participates). The address is also assigned to all InNHSs serving that routing domain. This address can then be used for establishing an initial connection to an InNHS, but not necessarily for sending InNHRP requests. The resulting VC may be used for InNHRP requests if the registration response is received over that VC, thereby indicating that there happens to be an anycast connected to an InNHS serving the LIS/LAG. In the case of non-connection oriented networks, or multicast (rather than anycast) addresses, the address should not be used for sending InNHRP resolution requests.

When an InNHS serves an InNHC, the InNHS sends InNHRP messages destined for the InNHC directly to the InNHC. That is, the InNHRP message does not transit through any InNHS that is not serving the InNHC. Further, an InNHS that serves an InNHC should have a direct NBMA level connection to that InNHC.

With the exception of InNHRP registration requests, an InNHC sends InNHRP messages over a direct NBMA level connection between the serving InNHS and itself.

It may not be desirable to maintain NBMA level connectivity between the InNHC and the InNHS. In this case, when NBMA level connectivity is initially setup between the InNHS and the InNHC, the NBMA address of the InNHS should be obtained through NBMA level signaling. This address should be stored for future use in setting up subsequent NBMA level connections. A somewhat more information rich technique to obtain the address information (and more) of the serving InNHS is for the InNHC to include the responder address extension in the InNHRP registration request and to store the information returned to the InNHC in the responder address extension that is included in the InNHRP registration reply. Note also that, in practice, a client's default (neighbor) router is also its InNHS; thus a client may know the NBMA address of its InNHS from the configuration that was already required for the client to be able to communicate. Further, InNHCs may be configured with the addressing information of one or more InNHSs.

Configuration:

Inverse Next Hop Clients:

An InNHC connected to an NBMA subnetwork may be configured with the Protocol (i.e., internetwork layer) address (es) and NBMA address(es) of its InNHS(s). The InNHS(s) will likely also represent the InNHC's default or peer routers, so their NBMA addresses may be obtained from the InNHC's existing configuration information. If the InNHC is attached to several subnetworks (including logical NBMA subnetworks), the InNHC should also be configured to receive routing information from its InNHS(s) and peer routers so that it can determine which internetwork layer networks are reachable through which subnetworks.

Inverse Next Hop Servers:

An InNHS is configured with knowledge of its own internetwork layer and NBMA addresses. An InNHS may also be configured with a set of internetwork layer address prefixes that correspond to the internetwork layer addresses of the stations it serves. The internetwork layer and NBMA addresses of the stations served by the InNHS may be learned via InNHRP Registration packets.

If a served InNHC is attached to several subnetworks, the router/route-server coresident with the serving InNHS may also need to be configured to advertise routing information to such InNHCs.

If an InNHS acts as an egress router for stations connected to other subnetworks than the NBMA subnetwork, the InNHS, in addition to the above, is configured to exchange routing information between the NBMA subnetwork and these other subnetworks. Routing information is exchanged using conventional, well-known, intra-domain and/or inter-domain routing protocols.

Figure 2:
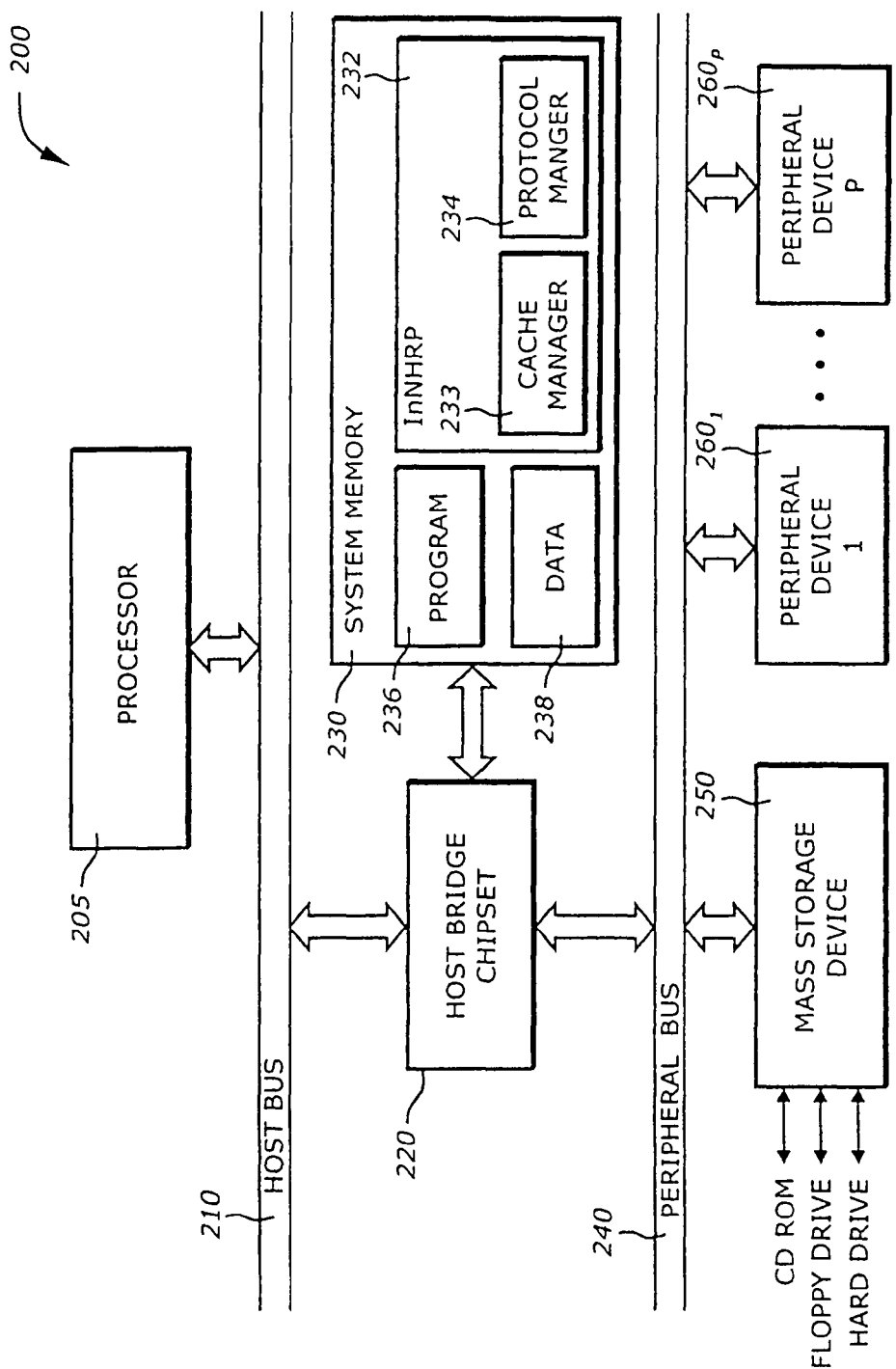
FIG. 2 is a diagram illustrating a computer system according to one embodiment of the invention.

FIG. 2 is a diagram illustrating a computer system 200 in which one embodiment of the invention can be practiced. The computer system 200 may be used in a router, a server, a host, or a source/destination station. The computer system 200 include a processor 205, a host bus 210, a host bridge chipset 220, a system memory 230, a peripheral bus 240, a mass storage device 250, and P peripheral devices $260_1$ to $260_P$.

The processor 205 represents a central processing unit of any type of architecture, such as complex instruction set computers (CISC), reduced instruction set computers (RISC), very long instruction word (VLIW), explicitly parallel instruction set computing (EPIC), or hybrid architecture. The invention could be implemented in a multi-processor or single processor computer system.

The host bridge chipset 220 comprises a number of interface circuits to allow the host processor 205 access to the system memory 230 and the peripheral bus 240. The system memory 230 represents one or more mechanisms for storing information. For example, the system memory 230 may include non-volatile or volatile memories. Examples of these memories include flash memory, read only memory (ROM), or random access memory (RAM). The system memory 230 comprises an InNHRP module 232, a program 236 and a data 238. Of course, the system memory 130 preferably contains additional software (not shown), which is not necessary to understanding the invention. The InNHRP module 232 contains program and data that are used in the deployment of the InNHRP. The InNHRP module 232 comprises a cache manager 233 and a protocol manager 234. The cache manager 233 manages the cached database containing information obtained during the configuration, registration, and resolution phases. If the computer system 200 is used as a source station, the cache manager 233 comprises a source cache to store the information as cached by the source station. If the computer system 200 is used in a server, the cache manager 233 comprises a server cache to cache the information transmitted to the server. The InNHRP module 232 may be transferred from the mass storage device 250 or downloaded from a network via a network interface device. The program 234 contains other programs or modules to support the operations of the InNHRP module 232. The data stored data or information used by the InNHRP module 232 or the program 234.

The mass storage device 250 comprises CD ROM, floppy diskettes, and hard drives and stores non-volatile data. The mass storage device 250 comprises medium controllers to read machine-readable medium such as CD ROM and floppy diskettes. In one embodiment of the invention, the machine-readable medium stores program code segments for performing a specified task.

The peripheral devices $260_1$ to $260_P$ are connected to the peripheral bus 240 to perform peripheral tasks. Examples of peripheral devices include a network interface and a media interface. The network interface connects to communication channel such as the Internet. The Internet provides access to on-line service providers, Web browsers, and other network channels. The media interface provides access to audio and video devices.

When implemented in software, the elements of the present invention are essentially the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Figure 3:
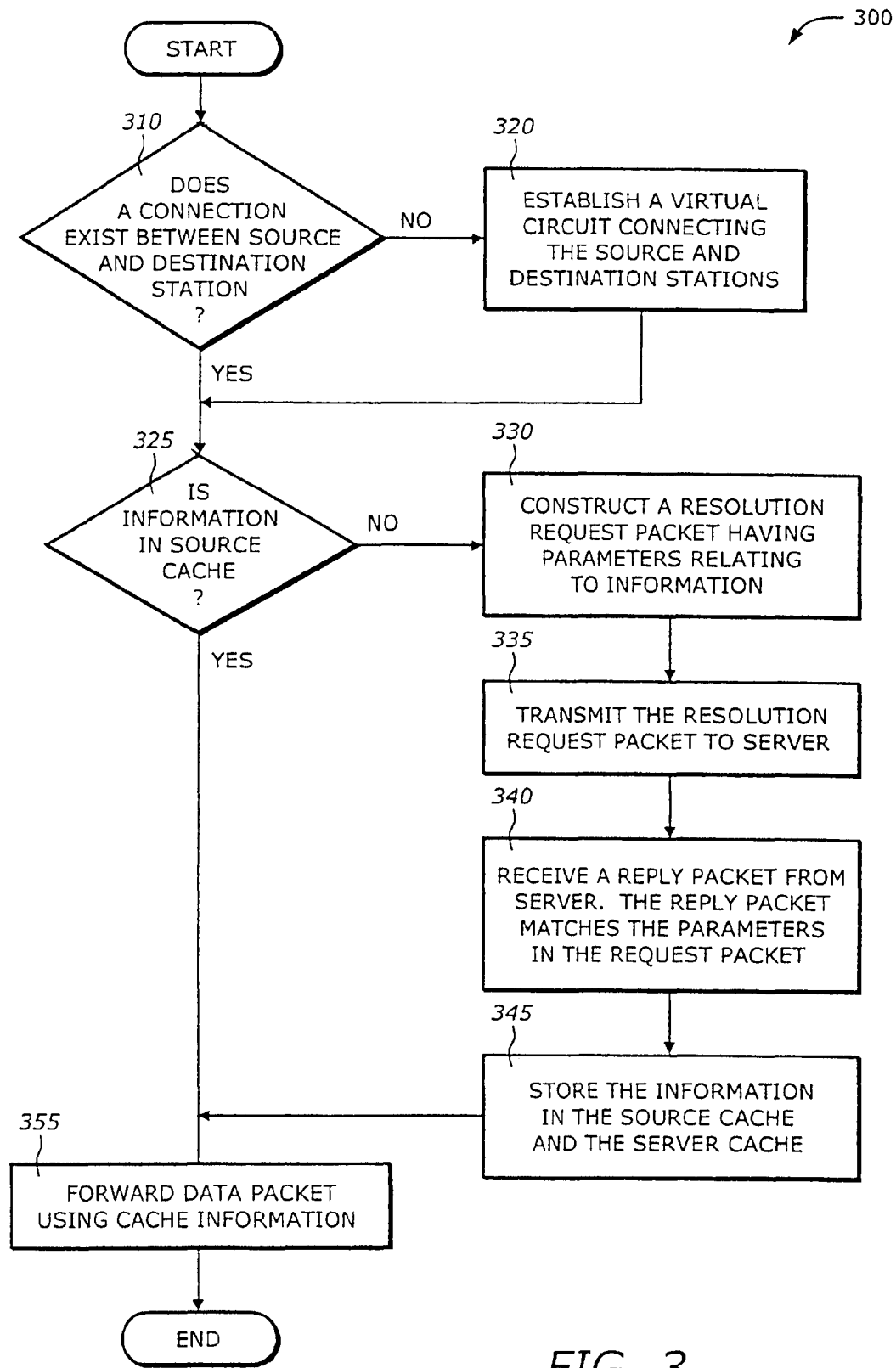
FIG. 3 is a flowchart illustrating a process to obtain information transmitted in a non-broadcast multiple access network according to one embodiment of the invention.

FIG. 3 is a flowchart illustrating a process 300 to obtain information transmitted in a non-broadcast multiple access network according to one embodiment of the invention. According to an embodiment of the present invention, a source station requests resolution of the information (e.g., internetwork layer address) for a destination station using the InNHRP protocol. As later described in another embodiment of the present invention, it is understood that the InNHRP protocol may be used to resolve an instance of upper layer resources, such as Domain Name Service (DNS) information, a server name, and application layer specific information. Resolution of an internetwork layer address is most likely to occur when a data packet addressed to the destination station is to be transmitted from the source station, but the resolution request could also be triggered by or for other means.

Upon START, the process 300 determines if a connection exists between the source station and the destination station (Block 310). If not, the process 300 establishes a virtual circuit connecting the source station and the destination station (Block 320). The virtual circuit is either a Permanent Virtual Circuit (PVC) or Switched Virtual Circuit (SVC), between the routers coupled to the source and destination stations. The process 300 then proceeds to Block 325. If a connection has been established between the source station and the server, the process 300 determines if the information is already in the cache of the source station (Block 325). If the information is in the source cache, the process 300 forwards the data packet to the destination using the cached information (Block 355) and the process 300 is terminated.

If the information is not in the source cache, the process 300 begins the resolution phase. If the destination station is reachable through one of source station's NBMA interfaces, the process 300 constructs a resolution request packet, which contains parameters relating to the information (Block 330). If the information is the address, then the request packet contains the destination station's NBMA address as the (target) destination address, the source station's own internetwork layer address as the source address (Inverse Next Hop Resolution Request initiator), and the source station's NBMA addressing information. Then the process 300 transmits the constructed request packet to the server (Block 335).

The source station may, while awaiting an InNHRP resolution reply, choose to dispose of the data packet by: (a) dropping the packet, (b) retaining the packet until the InNHRP resolution reply arrives, or (c) forwarding the packet along the virtual circuit connection (VCC) toward the destination station. The choice of which of the above to perform is a local policy matter, though option (c) likely is preferable, since it allows data to flow to the destination while the internetwork layer address is being resolved. Note that an InNHRP resolution request for a given destination is not necessary for every packet. The InNHS that serves the source station via the source router, resolves the destination station's protocol layer address information, and generates a positive InNHRP resolution reply on the destination station's behalf. The InNHRP resolution reply packet contains the protocol address for the destination station that is to be sent back to the source station. If the determination is made that the InNHS in the NBMA subnetwork can not reply to the InNHRP Resolution Request on behalf of the destination station, then a negative InNHRP Resolution Reply (NAK) is returned to the requesting station. This occurs when (a) no address resolution information is available for the destination station from the InNHS serving the source station.

Next, the process 300 receives a reply packet from the server (Block 340). The reply packet matches the parameters in the request packet. Then the process 300 stores the information in the cache of the source station and the server (Block 345). Then the process 300 proceeds to Block 355 and is then terminated.

An InNHRP message type can be created using the extensibility mechanisms discussed below with respect to FIGS. 5-8. For example, the TLV (time, length, value) extensions or the vendor private extensions illustrated in FIG. 8, can be appended to an NHRP request, reply and registration message to create a corresponding InNHRP message that requests, obtains, and supplies upper layer address information for a destination node. Additionally or alternatively, the version number or packet number of an NHRP packet may be modified to create an InNHRP message.

The address and resource resolutions using the InNHRP are done by exchanging messages or packets according to a well-defined protocol. The format of the protocol is followed by the source station, the destination station, and the servers in the network. The request packet and the reply packet are instances of a protocol packet.

Figure 4:
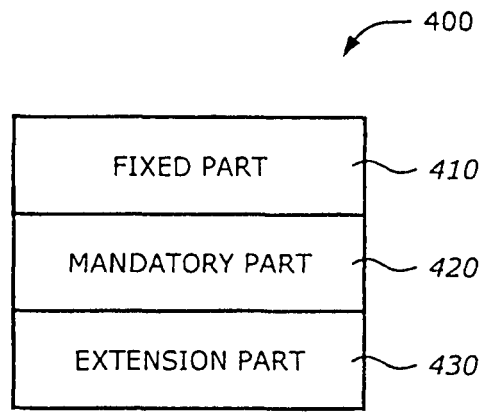
FIG. 4 is a diagram illustrating a format of a protocol packet according to one embodiment of the invention.

FIG. 4 is a diagram illustrating a format of a protocol packet 400 according to one embodiment of the invention. The protocol packet 400 is generally referred to as the InNHRP packet.

In the following, unless otherwise stated, the unqualified term "request" refers generically to any of the InNHRP packet types that are "requests". Further, unless otherwise stated, the unqualified term "reply" refers generically to any of the InNHRP packet types that are "replies".

The InNHRP packet 400 comprises a fixed part 410, a mandatory part 420, and an extensions part 430. The fixed part 410 is common to all InNHRP packet types. The mandatory part 420 is present, but varies depending on packet type. The extensions part 430 also varies depending on packet type, and need not be present.

It is contemplated that InNHRP packets will be members of a wider class of address mapping and management protocols being developed by the Internet Engineering Task Force (IETF). A specific encapsulation, based on the native formats used on the particular NBMA network over which InNHRP is carried, indicates the generic IETF mapping and management protocol. For example, SMDS networks use LLC/SNAP encapsulation at the NBMA layer, and an InNHRP packet is preceded by the following well known IEEE 802.2 Logical Link Control/Sub Network Access Protocol (LLC/SNAP) encapsulation format:

[0xAA-AA-03] [0x00-00-5E] [0x00-03]

The first three octets are LLC, indicating SNAP follows. The SNAP OUI portion is the IANA's OUI, and the SNAP PID portion identifies the mapping and management protocol. A field in the Fixed Header following the encapsulation indicates that it is an InNHRP packet.

ATM uses either LLC/SNAP encapsulation of each packet (including NHRP), or uses no encapsulation on VCs dedicated to a single protocol. Frame Relay and X.25 both use NLPID/SNAP encapsulation or identification of InNHRP and the same SNAP contents as above.

Fields marked "unused" are set to zero on transmission, and ignored on receipt.

Figure 5:
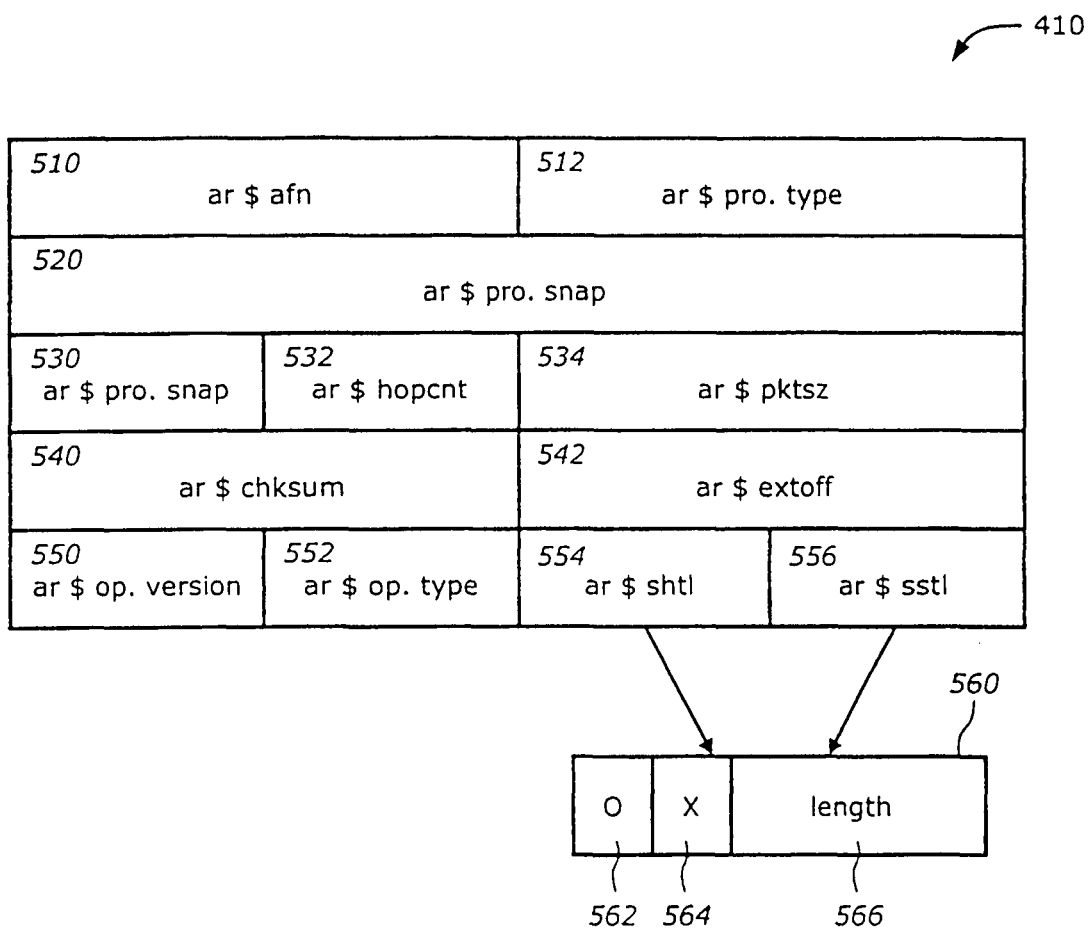
FIG. 5 is a diagram illustrating a format of a fixed part in the protocol packet according to one embodiment of the invention.

FIG. 5 is a diagram illustrating a format of a fixed part in the protocol packet according to one embodiment of the invention.

The fixed part 410 of the InNHRP packet contains those elements of the InNHRP packet which are always present and do not vary in size with the type of packet, including the protocol type field, SNAP field, subnetwork address type/length fields, etc. The fixed part 410 comprises a link layer field (ar$afn) 510, a first protocol field (ar$pro.type) 512, a second protocol field (ar$pro.snap) 520, a hop count field (ar$hopcnt) 532, a packet length field (ar$pktsz) 534, a checksum field (ar$chksum) 540, an extension offset field (ar$extoff) 542, a version field (ar$op.version) 550, a type field (ar$op.type) 552, a type and length source address field (ar$shtl) 554, and a type and length source subaddress field (ar$sstl) 556.

The ar$afn field 510 defines the type of "link layer" addresses being carried. This number is taken from the 'address family number' list specified in Reynolds, J., and Postel, J., "Assigned Numbers", STD 2, RFC 1700, October 1994. This field has implications to the coding of ar$shtl and ar$sstl as described below.

The ar$pro.type field 512 is a 16 bit unsigned integer representing the following number space:

0x0000 to 0x00FF Protocols defined by the equivalent NLPIDs

0x0100 to 0x03FF Reserved for future use by the IETF.
0x0400 to 0x04FF Allocated for use by the ATM Forum.
0x0500 to 0x05FF Experimental/Local use.
0x0600 to 0xFFFF Protocols defined by the equivalent Ethertypes.

(based on the observations that valid Ethertypes are never smaller than 0x600, and NLPIDs never larger than 0xFF.)

The ar$pro.snap fields 520 and 530: when ar$pro.type field 512 has a value of 0x0080, a SNAP encoded extension is being used to encode the protocol type. This SNAP extension is placed in the ar$pro.snap field 520. This is termed the 'long form' protocol ID. If ar$pro !=0x0080 then the ar$pro.snap field 520 is zero on transmit and ignored on receive. The ar$pro.type field 512 itself identifies the protocol being referred to. This is termed the 'short form' protocol ID.

In all cases, where a protocol has an assigned number in the ar$pro.type 512 space (excluding 0x0080), the short form is used when transmitting InNHRP messages; i.e., if Ethertype or NLPID codings exist then they are used on transmit rather than the ethertype. If both Ethertype and NLPID codings exist then when transmitting InNHRP messages, the Ethertype coding is used. So, for example, the following codings exist for IP:

SNAP: ar$pro.type=0x00-80, ar$pro.snap=0x00-00-00-08-00

NLPID: ar$pro.type=0x00-CC, ar$pro.snap=0x00-00-00-00-00

Ethertype: ar$pro.type=0x08-00, ar$pro.snap=0x00-00-00-00-00

Thus, since the Ethertype coding exists, it is used in preference.

The ar$hopcnt field 532 is not used.

The ar$pktsz field 534 specifies the total length of the InNHRP packet, in octets (excluding link layer encapsulation).

The ar$chksum field 540 specifies the standard IP checksum over the entire InNHRP packet starting at the fixed header. If the packet is an odd number of bytes in length then this calculation is performed as if a byte set to 0x00 is appended to the end of the packet.

The ar$extoff field 542 identifies the existence and location of InNHRP extensions. If this field is 0 then no extensions exist otherwise this field represents the offset from the beginning of the InNHRP packet (i.e., starting from the ar$afn field) of the first extension.

The ar$op.version field 550 indicates what version of generic address mapping and management protocol is represented by this message.

0 MARS protocol.
1 NHRP as defined in RFC 2332.
0x02-0xEF Reserved for future use by the IETF.
0xF0-0xFE Allocated for use by the ATM Forum.
0xFF Experimental/Local use.

Thus, a value of 0x02-0xEF, or 0xFF may be used to indicate a generic address mapping and management protocol for InNHRP messages. The InNHRP messages are utilized by an embodiment of the present invention to obtain an internetwork layer address for a particular station (e.g., IP address) given a media dependent address of the station or to obtain upper layer protocol resource information (e.g., transport or application layer resource, etc.).

The ar$op.type field 552 specifies a type of the protocol packet. When the ar$op.version field 550 equals a value identifying the packet as an InNHRP packet type, then InNHRP four packet types are specified: InNHRP Resolution Request (1), InNHRP Resolution Reply(2), InNHRP Registration Request(3), InNHRP Registration Reply(4).

The ar$shtl field 554 specifies the type and length of the source NBMA address interpreted in the context of the 'address family number' indicated by the ar$afn field 510.

The ar$sstl field 556 specifies the type and length of the source NBMA subaddress interpreted in the context of the 'address family number' indicated by the ar$afn field 510. When an NBMA technology has no concept of a subaddress, the subaddress length is always coded ar$sstl=0 and no storage is allocated for the subaddress in the appropriate mandatory part.

Subnetwork layer address type/length fields (e.g., ar$shtl, Cli Addr T/L) and subnetwork layer subaddresses type/length fields (e.g., ar$sstl, Cli SAddr. T/L) are coded according to the format 560. In the format 560, the most significant bit 562 is reserved and is set to zero. The second most significant bit (x) 564 is a flag indicating whether the address being referred to is in: NSAP format (x=0), or Native E.164 format (x=1). For NBMA technologies that do not use NSAP nor E.164 format addresses, x=0 is used to indicate the native form for the particular NBMA technology. The length field 566 is coded using 6 bits.

The length of the fixed part 410 is fixed at 20 octets. The length of the mandatory part 420 is determined by the contents of the extensions offset field 542 (ar$extoff). If ar$extoff=0x0 then the mandatory part length is equal to total packet length (given by the ar$pktsz field 534) minus 20 octets (for the fixed part 410), otherwise the mandatory part length is equal to ar$extoff minus 20 octets. The length of the extensions part 430 is implied by the ar$pktsz field 534 minus the ar$extoff field 542. InNHSs may increase the size of an InNHRP packet as a result of extension processing, but not beyond the offered maximum packet size of the NBMA network.

Most packet types (ar$op.type) have both internetwork layer protocol-independent fields and protocol-specific fields. The protocol type/snap fields (ar$pro.type/snap) qualify the format of the protocol-specific fields.

Figure 6:
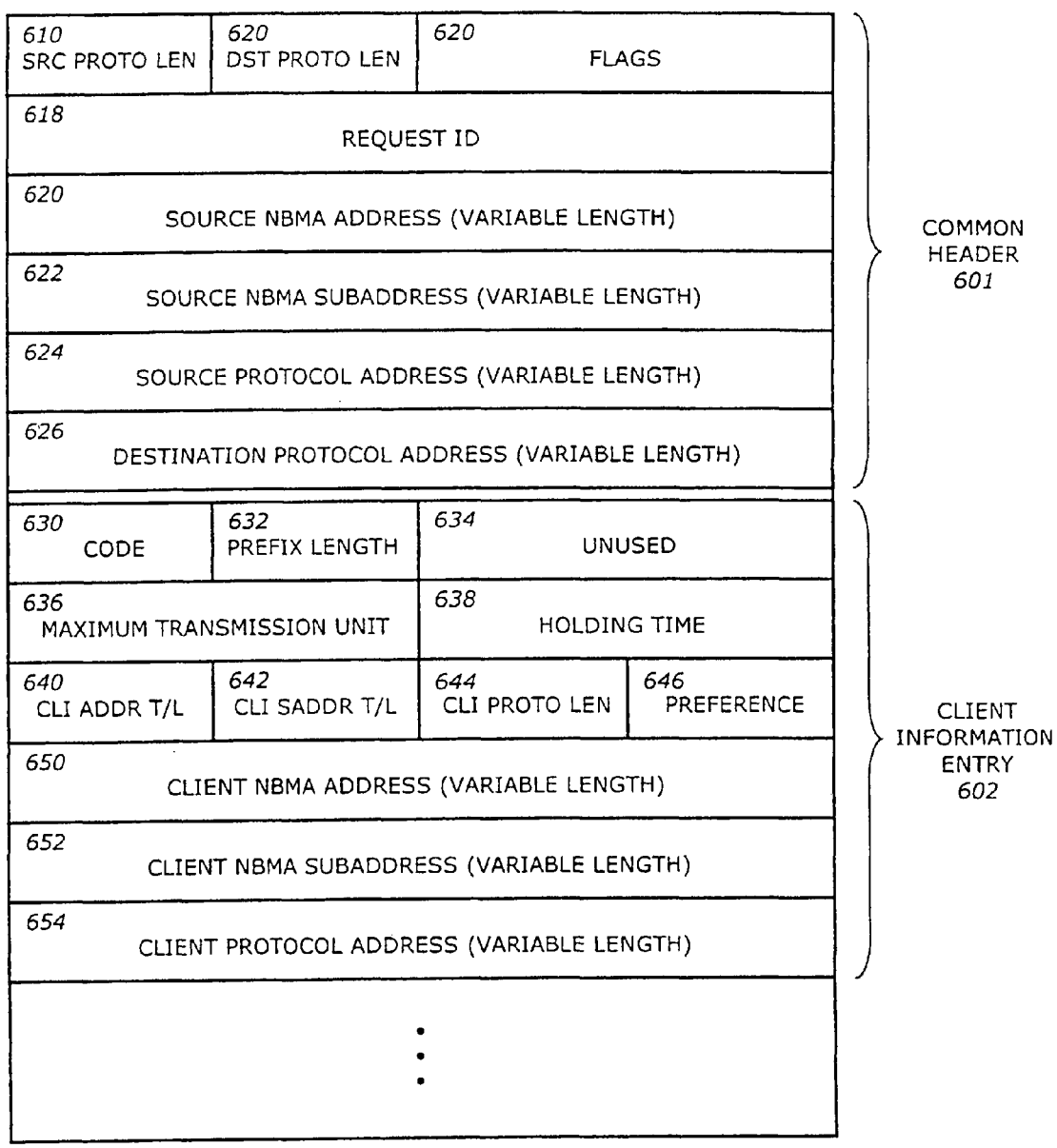
FIG. 6 is a diagram illustrating a format of a mandatory part in the protocol packet according to one embodiment of the invention.

FIG. 6 is a diagram illustrating a format of a mandatory part 420 in the protocol packet according to one embodiment of the invention. The mandatory part 420 of the InNHRP packet contains the operation specific information (e.g., InNHRP resolution request/reply, etc.) and variable length data which is pertinent to the packet type. The mandatory part 420 comprises a common header 601 and zero or more Client Information Entries (CIEs) 602.

The common header 601 comprises a source protocol length (Src Proto Len) field 610, a destination protocol length (Dest Proto Len) field 612, a flag field 614, a request identification (ID) field 618, a source NBMA address field 620, a source NBMA subaddress field 622, and a source protocol address field 626.

The Src Proto Len field 610 specifies the length in octets of the Source Protocol Address. The Dst Proto Len field 612 specifies the length in octets of the Destination Protocol Address.

Figure 7A:
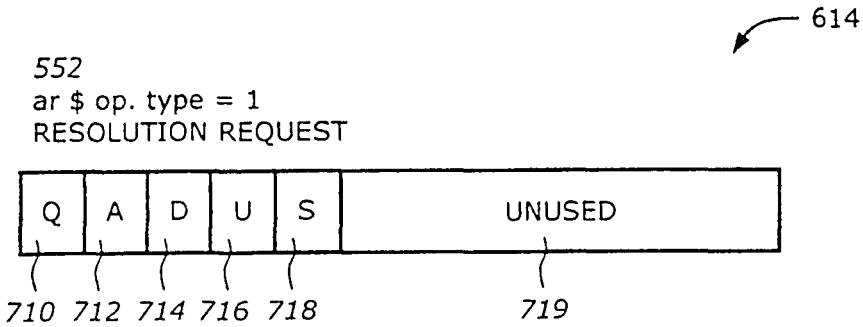
FIG. 7A is a diagram illustrating a format of a flag for the resolution request according to one embodiment of the invention.
Figure 7B:
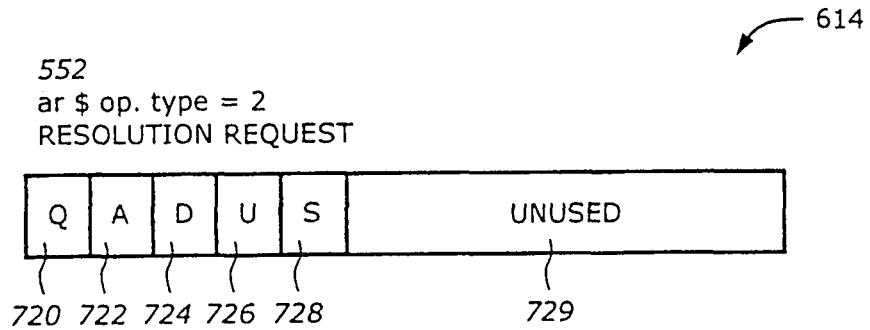
FIG. 7B is a diagram illustrating a format of a flag for the resolution reply according to one embodiment of the invention.
Figure 7C:
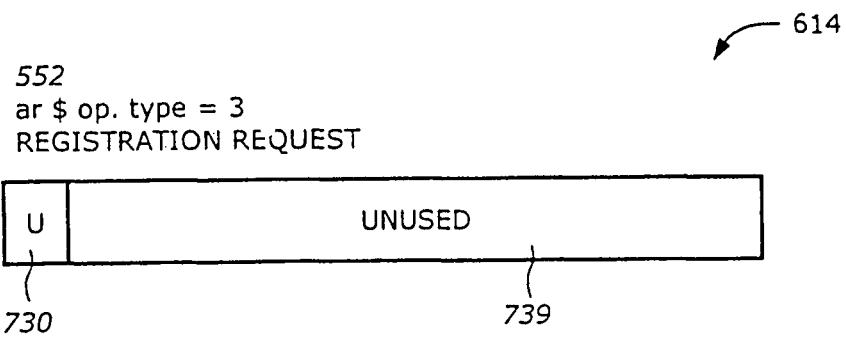
FIG. 7C is a diagram illustrating a format of a flag for the registration request according to one embodiment of the invention.

The flag field 614 is specific to the given message type and is explained in FIGS. 7A, 7B, and 7C.

The request ID field 618 specifies a request ID value which, when coupled with the address of the source station, provides a unique identifier for the information contained in a request packet. This value is copied directly from a request packet into the associated reply. When a sender of a request receives a reply, it will compare the request ID value and the source address information in the received reply against that found in its outstanding request list. When a match is found then the request is considered acknowledged by the reply.

The value for the request ID field 618 is taken from a 32 bit counter that is incremented each time a new "request" is transmitted. The same value is used when reseeding a "request", i.e., when a "reply" has not been received for a "request" and a retry is sent after an appropriate interval. It is recommended that the initial value for the counter be 0. A station may reuse a sequence number if and only if the reuse of the sequence number is not precluded by use of a particular method of synchronization.

The NBMA address/subaddress form specified below allows combined E.164/NSAPA form of NBMA addressing. The source NBMA address field 620 specifies the address of the source station that is sending the request. The source NBMA subaddress field 622 specifies the address of the source station that is sending the request. For those NBMA technologies that have "Calling Party Addresses", the source NBMA addresses above are the addresses used when signaling for a SVC.

The source protocol address field 624 specifies the protocol, (i.e., internetwork layer) address of the station that is sending the request packet. This is also the protocol address of the station toward which a reply packet is sent.

The destination protocol address field 626 specifies the protocol address of the station toward which a request packet is sent.

The CIE 602 comprises a code field 630, a prefix length field 632, an unused field 634, a maximum transmission unit field 636, a holding time field 638, a client address time and length field 640, a client subaddress time and length field 642, a client protocol length field 644, a preference field 646, a client NBMA address field 650, a client NBMA subaddress field 652, and a client protocol address field 654.

The code field 630 is message specific. In general, this field is a NAK code; i.e., when the field is 0 in a reply then the packet is acknowledging a request and if it contains any other value the packet contains a negative acknowledgment.

The maximum transmission unit field 636 specifies the maximum transmission unit for the relevant client station. If this value is 0 then either the default MTU is used or the MTU negotiated via signaling is used if such negotiation is possible for the given NBMA.

The holding time field 638 specifies the number of seconds for which the information specified in the CIE is considered to be valid. Cached information is discarded when the holding time expires. This field must be set to 0 on a NAK.

The Cli Addr T/L field 640 specifies the type and length of the NBMA address specified in the CIE. The Cli SAddr T/L field 642 specifies the type and length of NBMA subaddress specified in the CIE. When an NBMA technology has no concept of a subaddress, the subaddress is set to a null value with a length of 0. When the address length is specified as 0 no storage is allocated for the address.

The Cli Proto Len field 644 specifies the length in octets of the client protocol address specified in the CIE.

The preference field 646 specifies the preference for use of the specific CIE relative to other CIEs. Higher values indicate higher preference. The action to be taken when multiple CIEs have equal or highest preference value is a local matter.

The client NBMA address field 650 specifies the client's NBMA address. The client NBMA subaddress field 652 specifies the client's NBMA subaddress. The client protocol address field 654 specifies the client's internetworking layer address.

Note that an InNHS may cache source address binding information from an InNHRP resolution request if the conditions described in the cache management are met for the InNHS. In all other cases, source address binding information appearing in an InNHRP message is not cached.

The use of the CIE 602 depends on the type of the protocol packet.

Resolution request packet: The InNHRP resolution request packet has a Type value of 1 (i.e., ar$op.type=1).

Zero or one CIEs 602 may be specified in an InNHRP resolution request. If one is specified then that entry carries the pertinent information for the client sourcing the InNHRP Resolution Request. Usage of the CIE 602 in the InNHRP resolution request is described below:

The prefix length field 632: if a CIE is specified in the InNHRP Resolution Request then the Prefix Length field may be used to qualify the widest acceptable prefix which may be used to satisfy the InNHRP Resolution Request. In the case of InNHRP Resolution Request/Reply, the Prefix Length specifies the equivalence class of addresses that match the first "Prefix Length" bit positions of the Destination Protocol Address. If the "U" bit is set in the common header then this field is set to 0xFF.

The maximum transmission unit field 636: this field gives the maximum transmission unit for the source station. A possible use of this field in the InNHRP Resolution Request packet is for the InNHRP Resolution Requester to ask for a target MTU.

The holding time field 638: the holding time specified in the one CIE permitted to be included in an InNHRP Resolution Request is the amount of time which the source address binding information in the InNHRP Resolution Request is permitted to cached by a responding InNHS. Note that this field may only have a non-zero value if the S bit is set.

All other fields in the CIE are ignored and should be set to 0.

The Destination NBMA Address in the common header of the mandatory part of this message contains the NBMA address of the station for which resolution is desired. An InNHC sends the InNHRP resolution request directly to one of its serving InNHSs.

Resolution reply packet: The InNHRP resolution reply packet has a Type value of 2 (i.e., ar$op.type=2). CIEs correspond to entries in an InNHS's cache which match the criteria in the InNHRP resolution request.

One or more CIEs is specified in the InNHRP resolution reply. Each CIE contains InNHRP resource information that the responding InNHS has cached and which matches the parameters specified in the InNHRP Resolution Request. If no match is found by the InNHS issuing the InNHRP Resolution Reply, then a single CIE is enclosed with the CIE Code set appropriately (see below) and all other fields are ignored and should be set to 0.

The code field 630: If this field is set to zero then this packet contains a positively acknowledged InNHRP resolution reply. If this field contains any other value then this message contains an InNHRP resolution reply NAK which means that an appropriate NBMA address to internetworking layer binding was not available in the responding InNHS's cache. If the InNHRP resolution reply contains a Client Information Entry with a NAK Code other than 0 then it does not contain any other CIE.

The holding time field 638: The holding time specified in a CIE of an InNHRP resolution reply is the amount of time remaining before the expiration of the client information which is cached at the replying InNHS. It is not the value, which was registered by the client.

The remainder of the fields for the CIE is filled out as they were defined when registration occurred with the responding InNHS (or one of the responding InNHS's synchronized servers) via the InNHRP Registration Request.

Registration request packet: The InNHRP registration request is sent from a station to an InNHS to notify the InNHS of the station's internetwork layer address and/or upper layer protocol resource information. It has a Type value of 3. Each CIE corresponds to information that is to be cached at an InNHS.

The request ID field 618 has the same meaning as described above.

One or more CIEs is specified in the InNHRP registration request. Each CIE contains resource information that a client is attempting to register with its servers. Generally, all fields in CIEs enclosed in InNHRP registration requests are coded as described in above. However, if a station is only registering itself with the InNHRP Registration Request then it may code the Cli Addr T/L, Cli SAddr T/L, and Cli Proto Len as zero to signify that the client address information is to be taken from the source information in the common header. Below, further clarification is given for some fields in a CIE in the context of a InNHRP registration request.

The code field 630 is set to 0x00 in InNHRP registration requests.

The InNHRP registration request is used to register an InNHC's resource information with its InNHSs. If an InNHC is configured with the protocol address of a serving InNHS then the InNHC may place the InNHS's protocol address in the destination protocol address field 626 of the InNHRP registration request common header otherwise the InNHC places its own protocol address in the destination protocol address field 626.

When an InNHS receives an InNHRP registration request that has the destination protocol address field 626 set to an address that belongs to a LIS/LAG for which the InNHS is serving, then if the destination protocol address field 626 is equal to the source protocol address field 624 (which would happen if the InNHC put its protocol address in the destination protocol address) or the destination protocol address field 626 is equal to the protocol address of the InNHS, then the InNHS processes the InNHRP registration request after doing appropriate error checking (including any applicable policy checking).

When an InNHS receives an InNHRP registration request that has the destination protocol address field 626 set to an address that does not belong to a LIS/LAG for which the InNHS is serving then the InNHS forwards the packet to the appropriate LIS/LAG.

It is possible that a misconfigured station will attempt to register with the wrong InNHS (e.g., an InNHS that cannot serve it due to policy constraints). If this is the case, the InNHS replies with a NAK-ed Registration Reply of type Can't Serve This Address.

If an InNHS cannot serve a station due to a lack of resources, it replies with a NAK-ed Registration Reply of type Registration Overflow.

In order to keep the registration entry from being discarded, the station re-sends the InNHRP registration request packet often enough to refresh the registration, even in the face of occasional packet loss. It is recommended that the InNHRP registration request packet be sent at an interval equal to one-third of the holding time specified therein.

Registration reply packet: The InNHRP registration reply is sent by an InNHS to a client in response to that client's InNHRP Registration Request. If the code field 630 of a CIE 602 in the InNHRP registration reply has anything other than zero in it, then the InNHRP registration reply is a NAK otherwise the reply is an ACK. The InNHRP registration reply has a Type value of 4.

An InNHRP registration reply is formed from an InNHRP registration request by changing the type value from 3 to 4, updating the CIE code field 630, and filling in the appropriate extensions if they exist.

Attempts to register the information in the CIEs of an InNHRP registration request may fail for various reasons. If this is the case then each failed attempt to register the information in a CIE of an InNHRP registration request is logged in the associated InNHRP registration reply by setting the CIE code field 630 to the appropriate error code as shown below:

CIE code field 630:

0—Successful Registration. The information in the CIE was successfully registered with the NHS.

4—Administratively Prohibited. An InNHS may refuse an InNHRP Registration Request attempt for administrative reasons (due to policy constraints). If so, the InNHS sends an InNHRP registration reply that contains a NAK code of 4.

5—Insufficient Resources. If an InNHS cannot serve a station due to a lack of resources, the InNHS replies with a InNHRP registration reply that contains a NAK code of 5.

14—Unique NBMA Address Already Registered. If a client tries to register a NBMA address to upper layer resource binding with the uniqueness bit on and the NMBA address already exists in the InNHS's cache and if that cache entry also has the uniqueness bit on then this NAK Code is returned in the CIE in the InNHRP registration reply.

FIG. 7A is a diagram illustrating a format of a flag for the resolution request according to one embodiment of the invention. The flag field 614 for a resolution request comprises a Q field 710, an A field 712, a D field 714, an U field 716, an S field 718, and an unused field 719.

The Q field 710 is set if the source station sending the InNHRP Resolution Request is a router; clear if the source station is a host.

The A field 712 and the D field 714 are not used.

The U field 716 specifies a uniqueness value or bit. This bit aids in duplicate address detection. When this bit is set in an InNHRP Resolution Request and one or more entries exist in the InNHS cache which meet the requirements of the InNHRP Resolution Request then only the CIE in the InNHS's cache with this bit set will be returned. Note that even if this bit was set at registration time, there may still be multiple CIEs that might fulfill the InNHRP Resolution Request because an entire subnet can be registered through use of the Prefix Length in the CIE and the address of interest might be within such a subnet. If the "uniqueness" bit is set and the responding InNHS has one or more cache entries that match the request, but no such cache entry has the "uniqueness" bit set, then the InNHRP Resolution Reply returns with a NAK code of "13-Binding Exists But Is Not Unique" and no CIE is included. If a client wishes to receive non-unique entries, then the client must have the "uniqueness" bit set to zero in its InNHRP Resolution Request. Note that when this bit is set in an InNHRP Registration Request, only a single CIE may be specified in the InNHRP Registration Request and that CIE must have the Prefix Length field set to zero.

The S field 718 is set if the binding between the Source Protocol Address or other internetwork layer protocol or other upper layer protocol information and the Source NBMA information in the InNHRP Resolution Request is guaranteed to be stable and accurate.

FIG. 7B is a diagram illustrating a format of a flag for the resolution reply according to one embodiment of the invention. The flag field 614 for a resolution reply comprises a Q field 720, an A field 722, a D field 724, an U field 726, an S field 728, and an unused field 729.

The Q field 720 is copied from the InNHRP resolution request packet. It is set if the InNHRP resolution requester is a router; clear if it is a host.

The A field 722 is not used.

The D field 724 is set if the association between destination and the associate information included in all CIEs of the InNHRP Resolution Reply is guaranteed to be stable for the lifetime of the information (the holding time).

The U field 726 specifies a uniqueness value or bit. When this bit is set, only one CIE is included since only one unique binding should exist in an InNHS's cache.

The S field 728 is copied from InNHRP resolution request packet.

FIG. 7C is a diagram illustrating a format of a flag for the registration request according to one embodiment of the invention.

The flag field 614 for a resolution reply comprises a U field 730 and an unused field 739.

The U field 730 specifies a uniqueness value or bit. When set in an InNHRP registration request, this bit indicates that the registration of the protocol address or resource information is unique within the confines of the set of synchronized InNHSs. This "uniqueness" qualifier is stored in the InNHS/InNHC cache. Any attempt to register a binding between the protocol resource and an NBMA address when this bit is set is rejected with a Code of "14—Unique Internetworking Layer Address Already Registered" if the replying InNHS already has a cache entry for the NBMA address and the cache entry has the "uniqueness" bit set. A registration of a CIE's information is rejected when the CIE is returned with the Code field set to anything other than 0x00. See the description of the uniqueness bit in InNHRP Resolution Request section above for further details. When this bit is set, only one CIE may be included in the InNHRP Registration Request.

Figure 8:
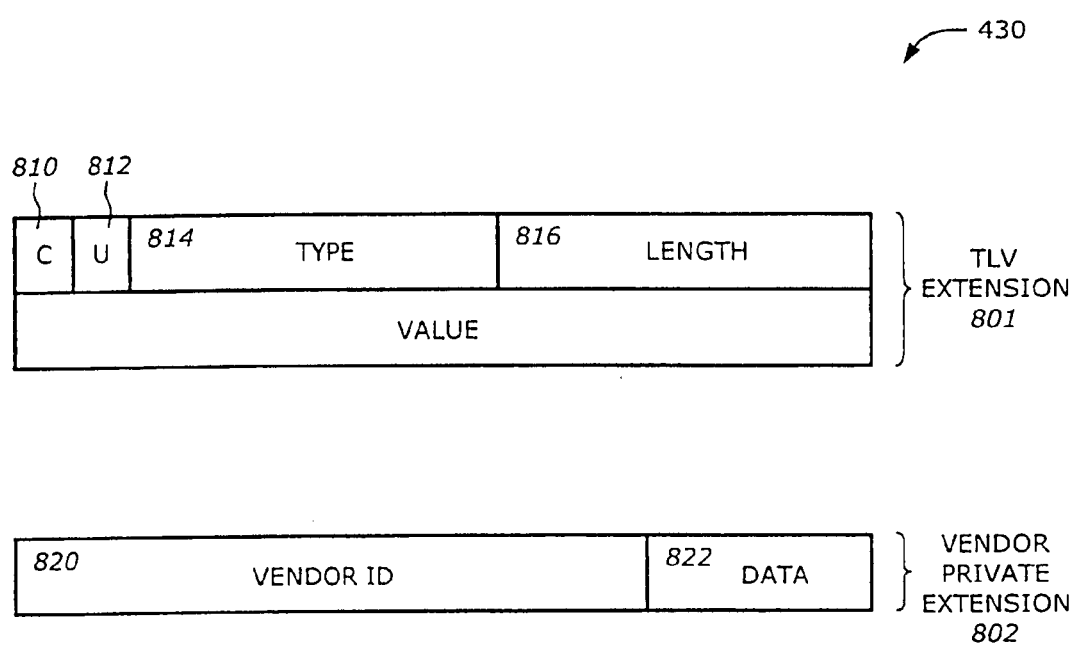
FIG. 8 is a diagram illustrating a format of an extension part in the protocol packet according to one embodiment of the invention.

FIG. 8 is a diagram illustrating a format of an extension part 430 in the protocol packet according to one embodiment of the invention.

The extensions part 430, if present, carries one or more extensions in Type, Length, Value (TLV) triplets. The TLV extensions may be used as an opaque octet string by an embodiment of the present invention to identify the packet as an InNHRP request, reply or registration packet, rather than using the ar$op.version field 550 shown in FIG. 5. Moreover, the TLV extension may be used to additionally or alternatively request or provide specific information regarding an internetwork layer address for a particular station. For example, the TLV field may be used to communicate a request regarding the IP address of a destination station. A source station, an InNHRP client, transmits an InNHRP message request to an InNHRP server (InNHS), specifying the media dependent address of the destination station, and requesting the internetwork layer address of the destination station. The request, as well as any reply from the InNHS, may be encoded as an opaque octet string in one or more generic or vendor private TLV extensions appended to an NHRP packet.

In the same manner, the TLV extension may be used to request or provide specific information regarding the availability, or instance of, an upper layer protocol resource. For example, the TLV field may be used to find the DNS. A source station transmits an InNHRP message request to an InNHRP server and requests the DNS. The server can locate the requested information in its cache by first matching the parameters such as the NBMA address of the destination station. Once it finds a match, it will locate the corresponding DNS response and will then issue a reply packet containing this information.

The extension part 430 comprises a compulsory field 810, an unused field 812, a type field 814, a length field 816, and a value field 818. The compulsory (C) field 810: If clear, and the InNHS does not recognize the type value 814, the extension may safely be ignored. If set, and the InNHS does not recognize the type value, the InNHRP "request" is considered to be in error. (See below for details.)

The U field 812 is not used and is set to zero.

The type field 814 specifies a type code below. The extension type is not qualified by the compulsory bit 810, but is orthogonal to it.

The length field 816 specifies the length in octets of the value field 818 (not including the Type and Length fields; a null extension will have only an extension header and a length of zero).

When extension's exist, the extensions list is terminated by the Null TLV, having the type field 814=0 and the length field 816=0. Extensions may occur in any order, but any particular extension type may occur only once in an InNHRP packet unless stated to the contrary in the extensions definition. For example, the vendor-private extension may occur multiple times in a packet in order to allow for extensions that do not share the same vendor ID to be represented. It is recommended that a given vendor include no more than one Vendor Private Extension.

An InNHS should not change the order of extensions. That is, the order of extensions placed in an InNHRP packet by an InNHC (or an InNHS when an InNHS sources a packet) must be preserved as the packet moves between InNHSs. Minimal InNHC implementations should recognize, but not necessarily parse, the vendor private extension and the End Of Extensions extension. Extensions are only present in a "reply" if they were present in the corresponding "request" with the exception of vendor private extensions. The previous statement is not intended to preclude the creation of InNHS-only extensions, which might be added to and removed from InNHRP packets by the same InNHS; such extensions should not be propagated to InNHCs.

The compulsory bit 810 provides a means to add to the extension set. If the bit is set in an extension, then the station responding to the InNHRP message that contains that extension is able to understand the extension (in this case, the station responding to the message is the station that would issue an InNHRP reply in response to a InNHRP request). As a result, the responder should return an InNHRP Error Indication of type Unrecognized Extension. If the Compulsory bit is clear then the extension can be safely ignored; however, if an ignored extension is in a "request" then it should be returned, unchanged, in the corresponding "reply" packet type.

The InNHRP extension type field 814 is subdivided to encourage use outside the IETF.

0x0000-0x0FFF Reserved for NHRP and InNHRP.
0x1000-0x11FF Allocated to the ATM Forum.
0x1200-0x37FF Reserved for the IETF.
0x3800-0x3FFF Experimental use.

The End Of Extensions: When extensions exist, the extensions list is terminated by the End Of Extensions/Null TLV. The End Of Extensions is coded as: compulsory=1, type=0, length=0.

Responder Address Extension: This extension is used to determine the address of the InNHRP responder; i.e., the entity that generates the appropriate "reply" packet for a given "request" packet. In the case of an InNHRP Resolution Request, the station responding may be different (in the case of cached replies) than the system identified in the InNHRP Resolution Reply. It is coded as compulsory=1, type=3, length=variable InNHRP vendor private extension 802. It is coded as compulsory=0, type=8, length=variable. The InNHRP vendor private extension 802 is carried in InNHRP packets to convey vendor-private information or InNHRP extensions between InNHRP speakers. The vendor private extension 802 comprises a vendor ID field 820, and a data field 822.

The vendor ID field 820 specifies the vendor ID.

The data field 822: the remaining octets after the Vendor ID in the payload are vendor-dependent data.

This extension may be added to any "request" or "reply" packet and it is the only extension that may be included multiple times. If the receiver does not handle this extension, or does not match the vendor ID in the extension then the extension may be completely ignored by the receiver. If a vendor private extension 802 is included in a "request" then it is copied to the corresponding "reply".

Cache Management Issues:

The management of InNHRP caches in the source station and InNHS serving the destination depends on a number of factors. The caching requirements are applicable for the source stations and the servers.

For the source stations, source stations cache all received InNHRP resolution replies that they are actively using. They also must cache "incomplete" entries, i.e., those for which a InNHRP resolution request has been sent but those for which an InNHRP resolution reply has not been received. This is necessary in order to preserve the request ID for retries, and provides the state necessary to avoid triggering InNHRP resolution requests for every data packet sent to the destination. Source stations purge expired information from their caches. Source stations purge the appropriate cached information upon receipt of an InNHRP purge request packet.

For the serving InNHSs, the InNHS serving the destination should cache resource information from all InNHRP resolution requests to which it has responded if the information in the InNHRP resolution reply has the possibility of changing during its lifetime (so that an InNHRP purge request packet can be issued). The internetwork resource to NBMA binding information provided by the source station in the InNHRP resolution request may also be cached only if the "S" bit is set, the InNHRP resolution request has included a CIE with the holding time field set greater than zero (this is the valid holding time for the source binding), and only for a period not to exceed the holding time.

Dynamics of Cached Information:

NBMA-Connected Destinations: InNHRP's most basic function is that of simple internetwork address resolution of stations directly attached to the NBMA subnetwork. These mappings are typically very static, and appropriately chosen holding times will minimize problems in the event that the NBMA address of a station must be changed. Stale information will cause a loss of connectivity, which may be used to trigger an InNHRP resolution request and bypass the old data. In the worst case, connectivity will fail until the cache entry times out. This applies equally to information marked in InNHRP resolution replies as being "stable" (via the "D" bit).

InNHRP over Legacy BMA Networks: There appears to be no significant impediment to running InNHRP over legacy broadcast subnetworks. Running InNHRP on broadcast media is possible, especially when setting up a cut-through for inter-ELAN inter-LIS/LAG traffic when one or both end stations are legacy attached.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method to obtain information transmitted between a source station and a destination station in a non-broadcast multiple access (NBMA) network, the method comprising:
    establishing a connection between the source station and a server for the destination station, the server including a server cache containing the information that at least partially includes a mapping of an NBMA subnetwork layer address of the destination station provided by the source station to an internetwork layer address of the destination station to resolve the internetwork layer address of the destination station;
    transmitting a request packet having parameters relating to the information to the server; and
    receiving a reply packet containing the information from the server, the reply packet matching the parameters of the request packet.

2. The method of claim 1 wherein the information comprises the internetwork layer address of the destination station.

3. The method of claim 1 wherein the information further comprises an instance of a resource information.

4. The method of claim 3 wherein the resource information comprises a resource availability and an upper layer address information.

5. The method of claim 2 wherein the request packet and the reply packet are instances of a protocol packet.

6. The method of claim 5 wherein the protocol packet comprises a fixed part and a mandatory part.

7. The method of claim 6 wherein the mandatory part comprises a common header.

8. The method of claim 7 wherein the mandatory pail further comprises at least a client information entry (CIE).

9. The method of claim 8 wherein the CIE comprises a code field specifying an acknowledgment of the request packet in the reply packet, a maximum transmission unit field specifying a maximum transmission unit and a holding time field specifying a holding time for which data in the CIE are valid.

10. The method of claim 9 wherein the CIE further comprises a client address time and length field specifying a time and length of a client address interpreted by the link layer address field in the fixed part, a client sub-address time and length field specifying a time and length of a client sub-address interpreted by the link layer address field in the fixed part, a client NBMA address field specifying a client NBMA address, a client NBMA sub-address field specifying a client NBMA sub-address, and a client protocol address field specifying a client internetworking layer address.

11. The method of claim 7 wherein the common header comprises at least one of a flag field specifying a flag and a request identification (ID) field specifying a request ID.

12. The method of claim 11 wherein the common header further comprises a source NBMA address field specifying the source NBMA address, a source NBMA sub-address field specifying the source NBMA sub-address, a source protocol address field specifying a source protocol address of the source station, and a destination protocol address field specifying a destination protocol address of one of the destination station and the server.

13. The method of claim 11 wherein the flag of the resolution request packet comprises at least one of a station type specifying whether the source station is a router or a host, a uniqueness value specifying that only a CIE matching the parameters and having the same uniqueness value is included in the reply packet, and a guarantee value specifying that a binding of the information is guaranteed stable and accurate.

14. The method of claim 11 wherein the flag of the resolution reply packet comprises at least one of a station type specifying whether the source station is a router or a host, a destination value specifying that an association of information between the destination and source stations is guaranteed stable within the holding time, a uniqueness value specifying that only a CIE matching the parameters and having the same uniqueness value is included in the reply packet, and a guarantee value specifying that a binding of the information is guaranteed stable and accurate.

15. The method of claim 11 wherein the flag of the registration request packet comprises at least a uniqueness value specifying that a registration of the information is unique.

16. The method of claim 5 wherein the protocol packet further comprises an extensions part.

17. The method of claim 16 wherein the fixed part comprises a type field specifying a packet type and an extension offset field specifying if the extension part exists and a location of the extension part if the extension part exists.

18. The method of claim 17 wherein the fixed part further comprises at least one of a link layer address field specifying a type of link layer addresses being carried, a type and length of source address field specifying a type and length of a source NBMA address, and a type and length of source sub-address field specifying a type and length of a source NBMA sub-address.

19. The method of claim 17 wherein the packet type is one of a resolution request type, a resolution reply type, a registration request type, and a registration reply type.

20. The method of claim 19 wherein the request packet is one of a resolution request packet and a registration request packet, the resolution and the registration request packets corresponding to the resolution and registration request types, respectively.

21. The method of claim 19 wherein the reply packet is one of a resolution reply packet and a registration reply packet, the resolution and the registration reply packets corresponding to the resolution and registration reply types, respectively.

22. The method of claim 16 wherein the extension part comprises at least an extension type-length-value (TLV) triplet.

23. The method of claim 22 wherein the extension TLV triplet in the protocol packet contains information regarding one of an internetwork layer address of a station, an internet protocol (IP) address of the destination station, an availability of an upper layer protocol resource, and an instance of an upper layer protocol resource.

24. The method of claim 23 wherein the extension TLV triplet comprises at least one of a compulsory value specifying if the extension part is ignored, an extension type specifying an extension protocol being used, an extension value specifying an extension information, and an extension length specifying a length of an extension value.

25. The method of claim 23 wherein the extension part is terminated by an end-of-extension TLV triplet.

26. The method of claim 23 wherein the extension TLV triplet contains vendor private information including a vendor identification.

27. A system comprising:

a server configured to operate in a non-broadcast multiple access network (NBMA), the server including a server cache configured to contain information regarding a destination station, the information at least partially comprising a mapping of an NBMA subnetwork layer address of the destination station provided by a source station to an internetwork layer address of the destination station to resolve the internetwork layer address of the destination station;

a source station coupled to the server via a connection to obtain the information, the source station configured to transmit a request packet to the server, the request packet having parameters relating to the information; and the server being configured to transmit a reply packet containing the information to the source station, the reply packet matching the parameters of the request packet.

28. The system of claim 27 wherein the request packet and the reply packet are instances of a protocol packet.

29. The system of claim 28 wherein the protocol packet comprises a fixed part and a mandatory part.

30. The system of claim 28 wherein the protocol packet further comprises an extensions part.

31. The system of claim 30 wherein the fixed part comprises a type field specifying a packet type and an extension offset field specifying a location of the extension part if the extension part exists.

32. The system of claim 31 wherein the fixed part further comprises a link layer address field specifying a type of link layer addresses being carried, a type and length of source address field specifying a type and length of a source NBMA address, and a type and length of source sub-address field specifying a type and length of a source NBMA sub-address.

33. The system of claim 31 wherein the mandatory part comprises a common header.

34. The system of claim 33 wherein the mandatory part further comprises at least a client information entry (CIE).

35. The system of claim 34 wherein the CIE comprises a code field specifying an acknowledgment of the request packet in the reply packet, a maximum transmission unit field specifying a maximum transmission unit and a holding time field specifying a holding time for which data in the CIE are valid.

36. The system of claim 35 wherein the CIE further comprises at least two of a client address time and length field specifying a time and length of a client address interpreted by the link layer address field in the fixed part, a client sub-address time and length field specifying a time and length of a client sub-address interpreted by the link layer address field in the fixed part, a client NBMA address field specifying a client NBMA address, a client NBMA sub-address field specifying a client NBMA sub-address, and a client protocol address field specifying a client internetworking layer address.

37. The system of claim 33 wherein the common header comprises at least one of a flag field specifying a flag and a request identification (ID) field specifying a request ID.

38. The system of claim 37 wherein the packet type is one of a resolution request type, a resolution reply type, a registration request type, and a registration reply type. the request packet being one of a resolution request packet and a registration request packet, the resolution and the registration request packets corresponding to the resolution and registration request types, respectively, and the reply packet being one of a resolution reply packet and a registration reply packet, the resolution and the registration reply packets corresponding to the resolution and registration reply types, respectively.

39. The system of claim 38 wherein the flag of the resolution request packet comprises at least one of a station type specifying whether the source station is a router or a host, a uniqueness value specifying that only a CIE matching the parameters and having the same uniqueness value is included in the reply packet, and a guarantee value specifying that a binding of the information is guaranteed stable and accurate.

40. The system of claim 38 wherein the flag of the resolution reply packet comprises at least one of a station type specifying whether the source station is a router or a host, a destination value specifying that an association of information between the destination and source stations is guaranteed stable within the holding time, a uniqueness value specifying that only a CIE matching the parameters and having the same uniqueness value is included in the reply packet, and a guarantee value specifying that a binding of the information is guaranteed stable and accurate.

41. The system of claim 38 wherein the flag of the registration request packet comprises at least a uniqueness value specifying that a registration of the information is unique.

42. The system of claim 37 wherein the common header further comprises a source NBMA address field specifying the source NBMA address, a source NBMA sub-address field specifying the source NBMA sub-address, a source protocol address field specifying a source protocol address of the source station, and a destination protocol address field specifying a destination protocol address of one of the destination station and the server.

43. The system of claim 30 wherein the extension part comprises at least an extension type-length-value (TLV) triplet.

44. The system of claim 30 wherein the extension TLV triplet in the protocol packet contains information regarding one of an internetwork layer address of a station, an internet protocol (IP) address of the destination station, an availability of an upper layer protocol resource, and an instance of an upper layer protocol resource.

45. The system of claim 44 wherein the extension TLV triplet comprises at least one of a compulsory value specifying if the extension part is ignored, an extension type specifying an extension protocol being used, an extension value specifying an extension information, and an extension length specifying a length of an extension value.

46. The system of claim 44 wherein the extension part is terminated by an end-of-extension TLV triplet.

47. The system of claim 44 wherein the extension TLV triplet contains vendor private information including a vendor identification.

48. The system of claim 27 wherein the information further comprises an instance of a resource information.

49. The system of claim 48 wherein the resource information comprises a resource availability and an upper layer address information.

50. A method to obtain information transmitted between a source station and a destination station in a nonbroadcast multiple access (NBMA) network, the method comprising:
    establishing a connection with a server for a destination station, the server including a cache that includes a mapping of an NBMA subnetwork layer address of the destination station to an internetwork layer address of the destination station to resolve the internetwork layer address of the destination station;
    receiving a first packet requesting resolution of an internetwork layer address for a destination station using an Inverse Next Hop Resolution Protocol (InNHRP); and
    returning a second packet in reply to the first packet, the second packet containing a protocol address for the destination station.

51. The method of claim 50 wherein the first packet and the second packet are instances of a protocol packet, the protocol packet comprises a fixed part, a mandatory part and an extension part.

52. The method of claim 51 wherein the fixed part comprises a type field specifying a packet type and an extension offset field specifying a location of the extension part.

\* \* \* \* \*